United States Patent
Jayaraman et al.

(10) Patent No.: US 6,901,103 B2
(45) Date of Patent: May 31, 2005

(54) DETERMINING COMBINER WEIGHTS AND LOG LIKELIHOOD RATIOS FOR SYMBOLS TRANSMITTED ON DIVERSITY CHANNELS

(75) Inventors: Srikant Jayaraman, San Diego, CA (US); Ivan Jesus Fernandez Corbaton, San Diego, CA (US); John Edward Smee, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 237 days.

(21) Appl. No.: 10/050,399

(22) Filed: Jan. 15, 2002

(65) Prior Publication Data

US 2003/0133520 A1 Jul. 17, 2003

(51) Int. Cl.$^7$ ................................................ H04B 1/69
(52) U.S. Cl. ..................... 375/130; 375/148; 375/341
(58) Field of Search ............................. 375/130, 148, 375/261–262, 340–342

(56) References Cited

U.S. PATENT DOCUMENTS

| | | | | |
|---|---|---|---|---|
| 4,901,307 | A | | 2/1990 | Gilhousen et al. ........... 370/320 |
| 5,103,459 | A | | 4/1992 | Gilhousen et al. ........... 370/206 |
| 6,377,607 | B1 | * | 4/2002 | Ling et al. .................. 375/130 |
| 6,385,181 | B1 | * | 5/2002 | Tsutsui et al. .............. 370/335 |
| 6,434,203 | B1 | * | 8/2002 | Halter ......................... 375/341 |
| 6,594,318 | B1 | * | 7/2003 | Sindhushayana ........... 375/262 |
| 6,714,585 | B1 | * | 3/2004 | Wang et al. ................ 375/148 |
| 2002/0116677 | A1 | * | 8/2002 | Morelos-Zaragoza ....... 714/781 |
| 2002/0136317 | A1 | * | 9/2002 | Oelcer et al. ............... 375/261 |
| 2003/0031234 | A1 | * | 2/2003 | Smee et al. ................. 375/147 |
| 2003/0035468 | A1 | * | 2/2003 | Corbaton et al. ........... 375/148 |

OTHER PUBLICATIONS

Qinghua et al., An Iterative Receiver for Turbo–Coded Pilot–Assisted Modulation in Fading Channels, Apr. 2001, IEE Commun. Letters, vol. 5, No. 4, pp. 145–147.*

Qinghua et al., An Iterative Decoding Scheme for Pilot–Assisted Modulation in Fading Channels, Nov. 27—Dec. 1, 2000, IEEE GlobeCom., vol. 2, pp. 807–811.*

Jayaraman et al., Determining Code Symbol LLRs on Diversity Channels with Applications to CDMA 2000, Sep. 2–5, 2002, IEEE 7th Int. Symp., pp. 807–811.*

Yang, et al., *Joint blind rate detection and data decoding scheme for CDMA mobile stations in frequency selective rayleigh fading channels*: pp. 449–453 XP010534093.

Nesper, et al., *A pilot symbol assisted interference cancellation scheme for an asynchronous DS/CDMA system*. Global Telecommunications Conference 1447–1451 (1996).

* cited by examiner

*Primary Examiner*—Amanda T. Le
*Assistant Examiner*—Lawrence B. Williams
(74) *Attorney, Agent, or Firm*—Philip R. Wadsworth; Thien T. Nguyen

(57) ABSTRACT

Methods and apparatus are presented herein for determining log likelihood ratios (LLRs) for code symbols. Pilot and code symbols are transmitted over diversity channels, which can be modeled as a slowly time varying system. A formulation for a multipath gain vector is derived herein based on the slowly time varying model. The multipath gain vector is then solved using iterative procedures. Using the solved multipath gain vector, the LLRs for code symbols are computed.

20 Claims, 5 Drawing Sheets

US 6,901,103 B2

DETERMINING COMBINER WEIGHTS AND LOG LIKELIHOOD RATIOS FOR SYMBOLS TRANSMITTED ON DIVERSITY CHANNELS

BACKGROUND

1. Field

The present invention relates generally to wireless communications. More specifically, the present invention relates to recovering information bits from code symbols and pilot symbols transmitted over diversity channels.

2. Background

Various over-the-air interfaces have been developed for wireless communications including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and proposed high-data-rate systems for data, etc. are promulgated by the Telecommunication Industry Association (TIA) and other well known standards bodies.

Communication systems configured in accordance with the IS-95 standard employ CDMA techniques to provide efficient and robust service. Exemplary communication systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. The cdma2000 proposal is compatible with IS-95 systems in many ways. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

In any communication system employing coherent demodulation, a known pilot signal is transmitted along with a data-bearing signal so that a receiver can coherently demodulate the data-bearing signal and recover the transmitted data. Typical coherent receivers extract information about the wireless channel's amplitude and phase characteristics from the received pilot signal, and then use this extracted information for coherent demodulation of the data-bearing signal. Although information relevant to the channel characteristics is also present in the received data-bearing signal, it is not presently known in the art how a receiver can exploit this information.

The embodiments described herein exploit channel information in both the received pilot and data-bearing signals, and so achieve improved demodulation performance, as measured by gains in signal-to-noise ratio (SNR). Improvements in demodulation performance are clearly desirable because such improvements translate directly to increased robustness and indirectly to increased system coverage and capacity. In one embodiment, pilot and code symbols are used to determine optimized diversity combiner weights, which are then used by the receiver to determine the transmitted code symbols. In another embodiment, the optimized diversity combiner weights are used by the receiver to determine likelihood ratios for the received code symbols, which can then be used for soft-decision decoding of the transmitted data bits.

SUMMARY

Methods and apparatus are presented herein to satisfy the needs addressed above. In one aspect, an apparatus is presented for determining likelihood values of input data bits from a plurality of code symbols and a plurality of pilot symbols, the apparatus comprising: a memory element; and a processor configured to execute a set of instructions stored in the memory element, the set of instructions for: determining a gain vector relating the plurality of code symbols and the plurality of pilot symbols in accordance with channel characteristics; and using the gain vector to determine likelihood values of a designated code symbol, wherein the input data bits are carried by the designated code symbol.

In another aspect, another apparatus is presented for determining a log likelihood ratio of a designated code symbol by using a plurality of code symbols and a plurality of pilot symbols transmitted over diversity channels, the apparatus comprising: a memory element; and a processor configured to execute a set of instructions stored in the memory element, the set of instructions for: receiving a frame of N' code symbols; dividing the frame of code symbols into N'/K groups of code symbols, wherein the $i^{th}$ group contains symbols with indices iK+1, . . . , (i+1)K; setting a counter for i, ranging from 0 to N'/K−1; setting a plurality of indices as follows: J={iK+1−$\underline{M}$, . . . , (i+1)K+$\overline{M}$}, J'={iK+1−$\underline{N}$, . . . , (i+1)K+$\overline{N}$}, N=$\underline{N}$+$\overline{N}$+K, and M=$\underline{M}$+$\overline{M}$+K; setting an initial gain vector condition defining $$\hat{\theta}_0 = y \equiv \frac{1}{N} \sum_{j' \in J'} y_{j'};$$

iterating a gain vector equation for a predetermined number of iterations, the gain vector equation defined by:

$$\hat{\theta}_n = \frac{y + (1/N)(\sigma_p^2/\sigma_t^2) \sum_{j \in J} g(x_j, \hat{\theta}_{n-1})}{1 + (M/N)(\sigma_p^2/\sigma_t^2)},$$

wherein $$\sigma_p^2/\sigma_t^2$$

is a pilot-to-traffic ratio; setting the last value of $\hat{\theta}_n$ as $\hat{\theta}$; computing a value $$\Lambda_k = \frac{2}{\sigma_t^2} \text{Re}\{\hat{\theta}^H x_k\}$$

for each k=iK+1, . . . , (i+1)K; and incrementing i and repeating the above steps so that a plurality of values {$\Lambda_1$, . . . , $\Lambda_{N'}$} is obtained.

DETAILED DESCRIPTION

The transmitted signals in communication systems are inherently prone to degradations such as channel noise and interference. Depending on the level of channel noise and interference, the transmitted data may or may not be recoverable at the receiver. Various Error Control Coding (ECC) techniques exist for increasing the overall robustness of the communication system to noise and interference from the channel. The basic idea behind such techniques is to introduce redundant information in the stream of transmitted data. If errors were to occur in the reception of the transmitted signal, the data may still be recovered by exploiting this redundancy.

An example of an ECC technique is convolutional coding. In convolutional coding, binary data bits are input to a finite state machine (FSM), which produces one or more binary outputs for every input data bit. The outputs of this FSM are called code symbols. A typical method for constructing such a FSM is through one or more convolutional encoders, i.e., finite impulse response (FIR) binary digital filters operating using arithmetic in the Galois Field GF(2). If the code symbols are corrupted by noise and interference during transmission over a noisy channel, the data bits may still be recoverable through suitable inferences based upon the corrupted code symbols. Inferences are possible because the code symbols are "redundant", i.e., the code symbols contain information about not only the input data bits but also the "internal state" of the FSM. Methods for optimally inferring the input data bits from the received code symbols are known in the art and are commonly referred to as Trellis Decoding Algorithms, e.g., the Viterbi Algorithm, or the Stack Algorithm.

Another example of an ECC technique is turbo coding. Turbo coding employs two or more convolutional encoders in parallel, in series, or in a combination thereof. The resulting sequence of code symbols also possesses redundant information about the input data bits. Furthermore, methods for optimally inferring the input data bits from the received code symbols are known in the art and are commonly referred to as turbo decoding algorithms.

In a typical communication system, a "source" generates a stream of information bits representing, for example, voice or data "traffic". This stream of bits is subdivided and grouped, various control bits are appended, and the result is packed into a suitable format for transmission. Voice and data traffic can be transmitted in various formats, such as, e.g. frames, packets, and subpackets. The scope of the embodiments described herein extends to all wireless communication systems using any of the various transmission formats. However, for the purpose of illustrative ease, the term "frame" will be used herein to describe the transmission format in which traffic is carried.

Figure 1A:
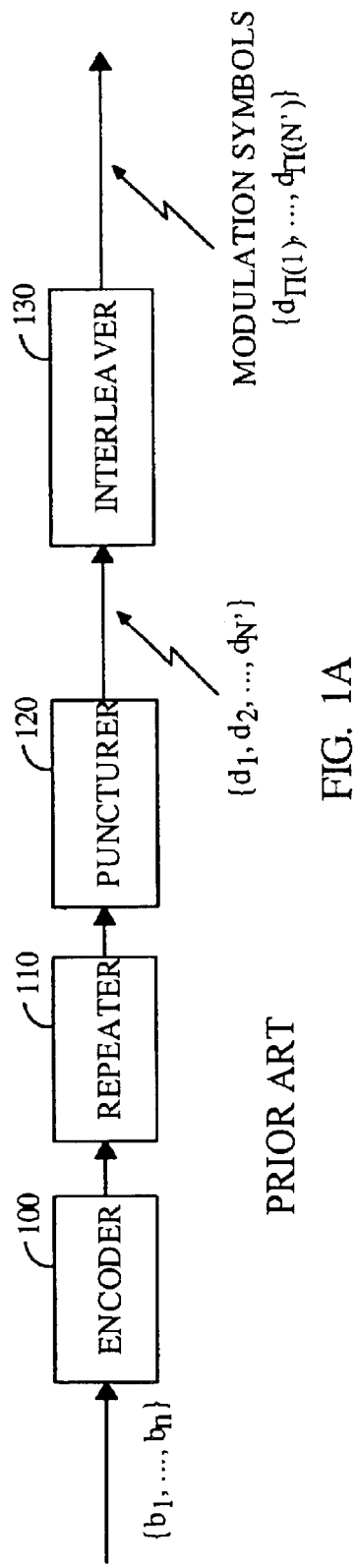
FIG. 1A is a block diagram of an encoding process.

In a typical CDMA spread spectrum communication system, frames comprising bits $\{b_1, \ldots, b_n\}$ are convolutionally or turbo encoded, repeated, and punctured to produce a sequence of binary code symbols $\{d_1, \ldots, d_{N'}\}$. The effective code rate is n/N'. The resulting code symbols are interleaved to obtain a frame of modulation symbols $\{d_{\pi(1)}, \ldots, d_{\pi(N')}\}$, where $\pi: \{1, \ldots, N'\} \to \{1, \ldots, N'\}$ denotes an interleaving function, i.e., a permutation. FIG. 1A is a functional block diagram of an encoding process. Information bits $\{b_1, \ldots, b_n\}$ are encoded at block 100. A repeating element is represented at block 110, where the encoded bits are repeated at a predetermined repetition rate. The encoded and repeated symbols are then punctured at block 120. The rates at which encoding, repeating, and puncturing occur are system-defined parameters that rely upon transmission rate requirements. Block 130 represents the interleaving process. The output of the interleaver is referred to herein as modulation symbols.

Figure 1B:
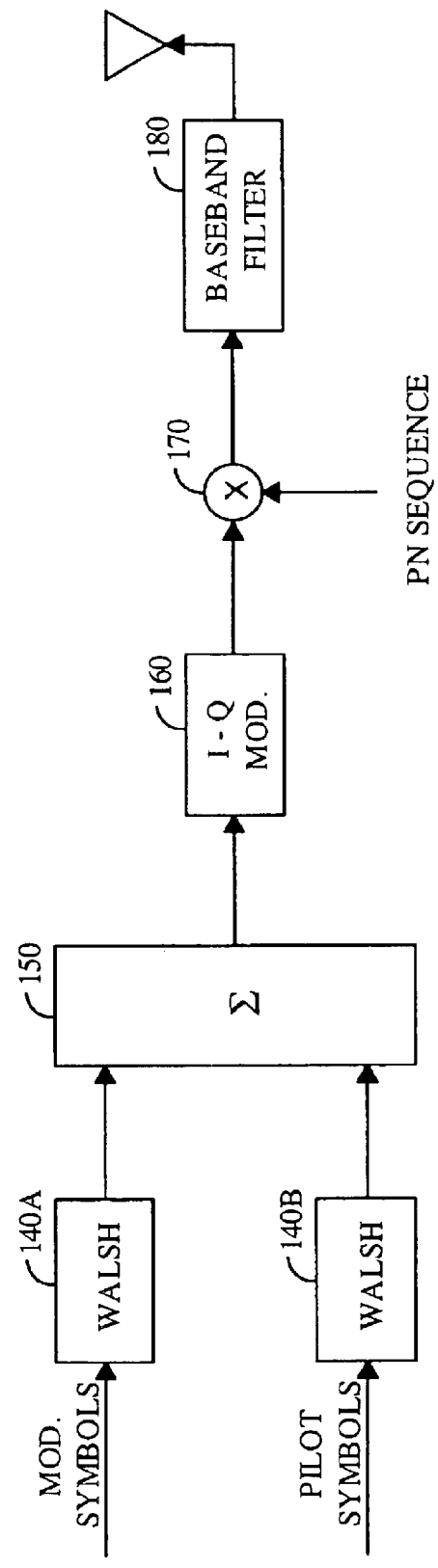
FIG. 1B is a block diagram of a modulation scheme.

The modulation symbols are then Walsh covered and combined with a pilot sequence on the orthogonal-phase branch, PN-spread, baseband filtered, and modulated onto the transmit carrier signal. FIG. 1B is a functional block diagram of this process. The modulation symbols $\{d_{\pi(1)}, \ldots, d_{\pi(N')}\}$ that are the output of the interleaver at block 130 undergo orthogonal spreading by a Walsh covering element 140a. In addition, a pilot sequence is concurrently spread by Walsh covering element 140b. The outputs from blocks 140a and 140b are then combined at summation element block 150 and then spread in quadrature at block 160. At block 170, the resulting stream is PN-spread. At block 180, the resulting stream is baseband filtered and modulated onto a transmit carrier signal.

Figure 2:
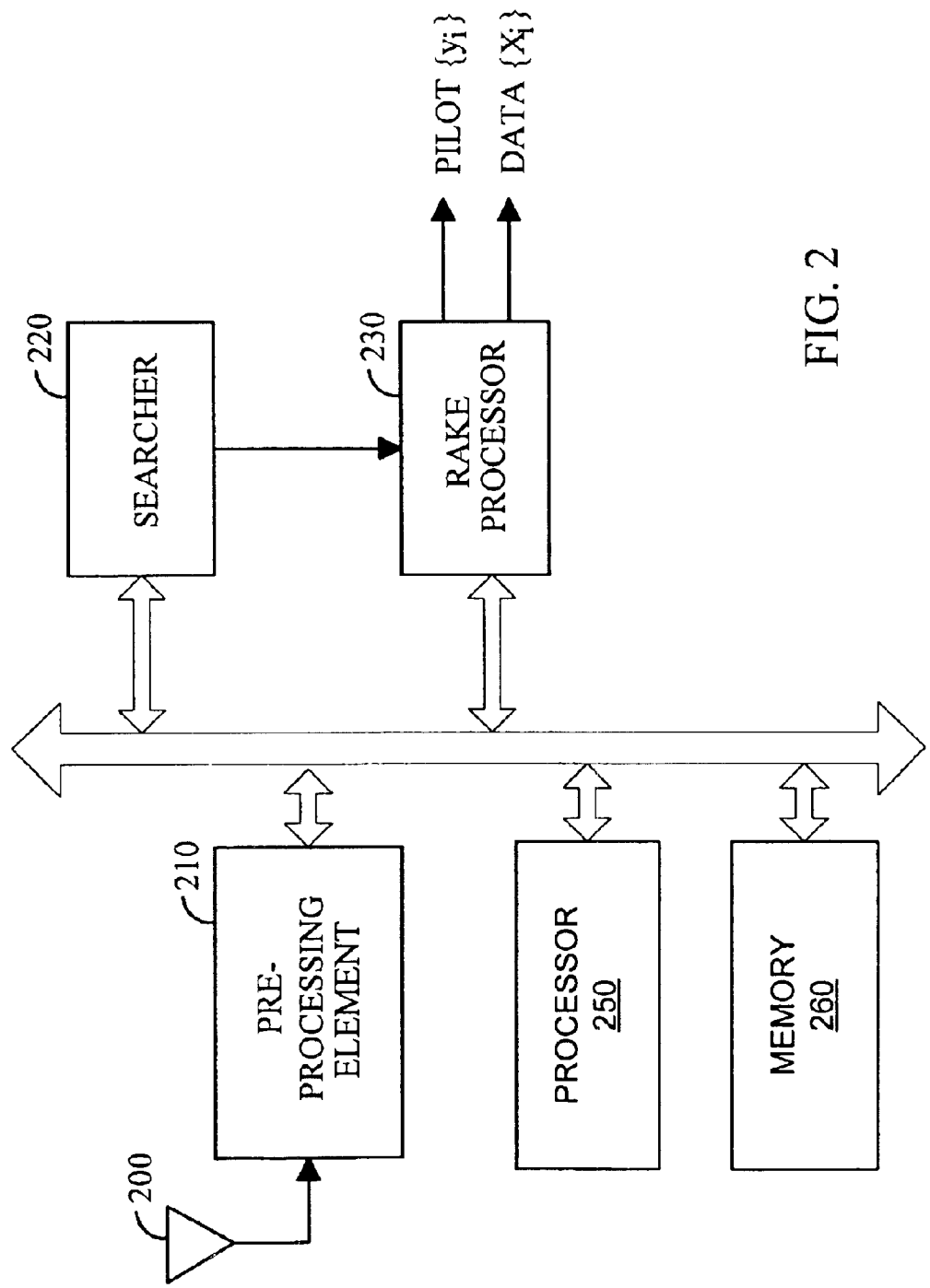
FIG. 2 is a block diagram of a receiver with a searcher and RAKE processor.

The signal propagates to the receiver over multiple transmission paths and is received as a superposition of multiple components, each with its own amplitude, phase and time delay. These multiple transmission paths are referred to as "multipaths" and are commonly caused by reflections off objects present in the transmission path. At the receiver the signal is match-filtered, sampled, digitized and down-converted to complex baseband before it is fed to a searcher and a RAKE processor. The searcher usually determines the time delays of the multipath components in the received signal. The RAKE processor comprises multiple "fingers", each of which is synchronized to the time delay of a particular multipath component. Each RAKE finger is configured to PN-despread the sampled and digitized waveform using the PN code synchronized to that finger's particular time delay. Additionally, each RAKE finger is able to perform Walsh de-covering to separate the modulation symbols from the orthogonal pilot symbols. The output of the RAKE processor can be represented by a sequence of received modulation symbols $\{x_1, \ldots, x_{N'}\}$, and a corresponding sequence of pilot symbols $\{y_1, \ldots, y_{N'}\}$. FIG. 2 is a block diagram of the above-described process within a receiver. A signal is received over the air by at least one antenna 200. The signal is match-filtered, sampled, digitized, and down-converted to complex baseband by a pre-processing element 210 before the signal is fed to the searcher 220 and the RAKE processor 230. The searcher 220 determines the time delays of each of the components of the received signal and assigns a RAKE finger (not shown) in the RAKE processor 230 to each component. The outputs of the RAKE processor are the two sequences $\{x_j\}$ and $\{y_j\}$.

The received modulation and pilot symbols are complex vectors of length L, where L is the number of fingers in the RAKE processor. The $\int^{th}$ component of the vector $x_j$ is the $j^{th}$ modulation symbol received on the $\int j^{th}$ RAKE finger. Similarly, the $\int^{th}$ component of the vector $y_j$ is the $j^{th}$ pilot symbol received on the $\int^{th}$ RAKE finger. The vectors are complex because the quantities represented are in complex baseband form.

The received modulation and pilot symbols are related to each other through a "multipath gain vector" and to the binary code symbols $\{d_1, \ldots, d_{N'}\}$ by the relationships below:

$$x_j = \vec{\theta}_j d_{\pi(j)} + n_j \qquad \text{Equation (1)}$$

$$y_j = \vec{\theta}_j + \tilde{n}_j.$$

For each j=1, ..., N', the terms $n_j$ and $\tilde{n}_j$ denote the noise and interference affecting the received modulation and pilot symbols, respectively. Both $n_j$ and $\tilde{n}_j$ can be modeled as sequences of independent, L-dimensional, random vectors. The components of $n_j$ and $\tilde{n}_j$ have variance $\sigma_t^2$ and $\sigma_p^2$, respectively. The multipath gain vector $\vec{\theta}_j$ is an L-dimensional vector whose $i^{th}$ component denotes the complex amplitude and phase gain for the $i^{th}$ RAKE finger and the $j^{th}$ received symbol. The multipath gain vector a is a function of the multipath channel and is a priori unknown to the receiver.

Equation (1) is a general representation of an L-th order complex diversity channel. As described heretofore, this representation arises from assigning L RAKE fingers to L different multipath components in the received signal, and is sometimes called multipath diversity. In another embodiment, this representation can arise from the use of multiple spatially separated antennas at the receiver, where RAKE fingers are assigned to different multipath components on different antennas. This method is commonly known as spatial or antenna diversity. For example, if $L_1$ RAKE fingers are assigned to multipath components on antenna 1, and $L_2$ RAKE fingers are assigned to multipath components on antenna 2, the representation of Equation (1) holds with $L=L_1+L_2$. In another embodiment where the same modulation symbols are transmitted on different frequency bands or on different carriers, this representation can arise from assigning RAKE fingers to different multipath components on different carriers. This method is called frequency or carrier diversity. In still another embodiment where the same modulation symbols are repeated or retransmitted in future frames or time slots, this representation can arise from assigning RAKE fingers to different multipath components on the different time slots. This is sometimes known as time diversity. For example, if $L_1$ RAKE fingers are assigned to multipath during the first transmission, and $L_2$ RAKE fingers are assigned to multipath components on the second transmission, the representation of Equation (1) holds with $L=L_1+L_2$.

The goal at the receiver is to recover the information bits $\{b_1, \ldots, b_n\}$ from the received modulation and pilot symbols, $\{x_1, \ldots, x_{N'}\}$, and $\{y_1, \ldots, y_{N'}\}$. This, in turn, requires decoding the convolutional or turbo code.

The decoding process typically requires computing Log Likelihood Ratios (LLRs) for the code symbols. For the $j^{th}$ code symbol, the LLR is defined roughly as:

$$\Lambda(d_j) = \log \frac{Pr\{\text{"received symbols"} | d_j = +1\}}{Pr\{\text{"received symbols"} | d_j = -1\}}. \qquad \text{Equation (2)}$$

The collection of LLRs $\{\Lambda(d_j)\}$ are known in the art as "sufficient statistics" for recovering the transmitted information bits. Hence, the LLRs contain all the information in the received symbols that is relevant to decoding the frame. Furthermore, typical convolutional decoding algorithms such as, e.g., the Viterbi Algorithm or the Stack Algorithm, require code symbol LLRs as their inputs. Turbo decoding algorithms such as, e.g., those based on the Bahl-Cocke-Jelinek-Raviv Algorithm, also require code symbol LLRs as their inputs. In practice, it is not easy to find and compute a function that behaves like a LLR "sufficient statistic" and captures all the relevant information in the output of the diversity channel. The traditional approach is to resort to a suboptimal calculation called "Pilot Filter Maximal Ratio Combining (MRC)."

In the Pilot Filter MRC method, code symbol LLRs are computed based on channel characteristic information derived solely from the received pilot symbols. In many wireless communication systems the pilot signal is transmitted concurrently with the data-bearing signals. Hence, the transmission paths of the pilot signal share similar amplitude and phase characteristics as the transmission paths of the data-bearing signals. The practice of those of ordinary skill in the art is to use information derived from observations of the pilot signal to determine likelihood values for the code symbols of the data-bearing signal.

In the Pilot Filter MRC method, a combiner weight is determined in accordance with:

$$y = \frac{1}{N} \sum y_j. \qquad \text{Equation (3)}$$

The LLRs $\{\Lambda_k\}$ calculated using the Pilot Filter MRC method take on values as follows:

$$\Lambda_k = c \, Re\{y^H x_k\}, \qquad \text{Equation (4)}$$

where the constant c depends upon the code symbol signal-to-noise ratio (SNR) and the superscript H represents the Hermitian transpose of the matrix.

To the extent that this combiner weight y is close to $\vec{\theta}$, which is the true multipath gain vector, the performance approaches nearly ideal maximal ratio combining (MRC). However, the pilot filter weight y usually deviates from the true multipath gain vector because the pilot channel SNR is not high and because there are only finitely many pilot symbols N in the estimate. The deviation from the ideal can be quite large when the pilot channel SNR is "weak". Increasing N, the number of pilot symbols in the estimate, yields a more accurate combiner weight when the channel is static. However, when the channel is slowly time varying due to relative motion of the transmitter and/or of the receiver, or due to fluctuations of the medium, increasing N may affect overall performance adversely because the channel's characteristics are no longer fixed. In this case the changing channel characteristics outweigh any increased benefit from a longer filter length.

The embodiments described herein lead to more accurate combiner weights by exploiting the fact that the received modulation symbols also carry information on the multipath gain vector $\vec{\theta}$. This information can be used to improve the determination of the LLRs of the code symbols, and consequently, the performance of the decoder. The improved determination of the combiner weight occurs without sacrificing overall performance on slowly time-varying channels.

The embodiments herein describe a new methodology for determining code symbol LLRs, which results in a simple method for the computation of said LLRs. Using these embodiments, a SNR gain on the order of 0.5 dB over the traditional pilot filter MRC approach can be achieved.

In one embodiment, the conceptual model of Equation 1 is replaced by the following model:

$$x_j = \vec{\theta} d_{\pi(j)} + n_j \qquad \text{Equation (5)}$$

$$y_{j'} = \vec{\theta} + \tilde{n}_{j'},$$

wherein k−$\underline{M}$≤j≤k+$\overline{M}$ and k−$\underline{N}$≤j'≤k+$\overline{N}$. The choice of $\underline{M}$, $\overline{M}$, $\underline{N}$, $\overline{N}$ depends on the rate of variation of the channel and the desired tradeoff between computational complexity and decoder performance. Examples of different parameter value implementations are discussed below. Conceptually, the indices j and j' can range from negative infinity to positive infinity. The embodiments described herein are for determining the LLR for $d_{\pi(k)}$, where π is a one-to-one and onto mapping of the integers, i.e., a permutation.

For notational convenience, define $$J \subseteq \{j : k - \underline{M} \leq j \leq k + \bar{M}\}$$

and $$J' \subseteq \{j' : k - \underline{N} \leq j' \leq k + \bar{N}\},$$

In the embodiments described below, the LLR for a code symbol $d_{\pi(k)}$ is defined as:

$$\Lambda_k = \log \frac{\max_{\vec{\theta}, \{d_{\pi(j)}: j \in J - \{k\}\}} p_{\vec{\theta}}(\{x_j, y_{j'} : j \in J, j' \in J'\} \mid d_{\pi(k)} = +1, \{d_{\pi(j)} : j \in J - \{k\}\})}{\max_{\vec{\theta}, \{d_{\pi(j)}: j \in J - \{k\}\}} p_{\vec{\theta}}(\{x_j, y_{j'} : j \in J, j' \in J'\} \mid d_{\pi(k)} = -1, \{d_{\pi(j)} : j \in J - \{k\}\})} \qquad \text{Equation (6)}$$

where $p_{\vec{\theta}}(\cdot|\cdot)$ denotes the respective conditional density when the multipath gain vector is $\vec{\theta}$. In addition, the following definitions are also used:

$$y \equiv \frac{1}{N} \sum_{j' \in J'} y_{j'},$$

where N≡|J'| and M≡|J|;

$$g(x, \vec{\theta}) \equiv \begin{cases} x, & \text{Re}\{\vec{\theta}^H x\} > 0 \\ -x, & \text{Re}\{\vec{\theta}^H x\} < 0 \\ 0, & \text{otherwise} \end{cases},$$

wherein the superscript H indicates the Hermitian transpose of the complex vector; and $$f_k(\vec{\theta}, d) \equiv \qquad \text{Equation 7}$$

$$\frac{1}{\sigma_t^2} \left\{ \frac{(M/N)(\sigma_p^2/\sigma_t^2)+1}{(2/N)(\sigma_p^2/\sigma_t^2)} \|\vec{\theta}\|^2 - \frac{N}{(\sigma_p^2/\sigma_t^2)} \text{Re}\{\vec{\theta}^H y\} - d\text{Re}\{\vec{\theta}^H x_k\} - \sum_{j \in J - \{k\}} \left| \text{Re}\{\vec{\theta}^H x_j\} \right| \right\}.$$

Figure 3:
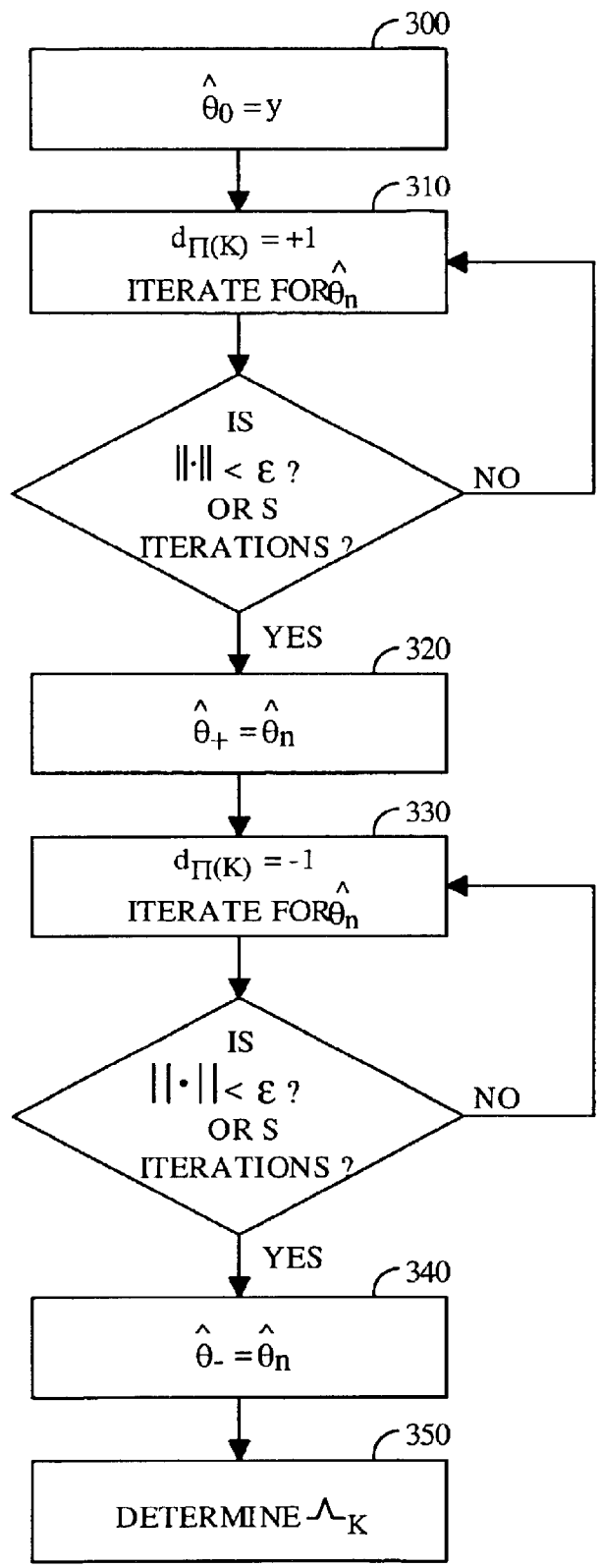
FIG. 3 is a flow chart illustrating a LLR computation procedure.

In one embodiment, an iterative procedure can be used to determine $\Lambda_k$. FIG. 3 is a flowchart of the iterative procedure. At step 300, let $\hat{\theta}_0 = y$.

At step 310, perform the iteration defined by the following equation, wherein $d_{\pi(k)}=+1$:

$$\hat{\theta}_n = \frac{y + (1/N)(\sigma_p^2/\sigma_t^2) \left[ \sum_{j \in J - \{k\}} g(x_j, \hat{\theta}_{n-1}) + d_{\pi(k)} x_k \right]}{1 + (M/N)(\sigma_p^2/\sigma_t^2)} \qquad \text{Equation 8}$$

The above equation is iterated until $\|\hat{\theta}_n - \hat{\theta}_{n-1}\| < \epsilon$ or S iterations have occurred, whichever occurs first. The term $\epsilon$ is a system defined tolerance value and the norm $\|\cdot\|$ can be any arbitrary mathematical function, such as the Euclidean distance, the sup norm, etc.

At step 320, label the last value of $\hat{\theta}_n$ as $\hat{\theta}_+$.

At step 330, perform the iteration of step 310 but with the value $d_{\pi(k)}=-1$.

At step 340, label the last value of $\hat{\theta}_n$ as $\hat{\theta}_-$.

At step 350, compute the following relationship:

$$\Lambda_k = f_k(\hat{\theta}_-, -1) - f_k(\hat{\theta}_+, +1)$$

Figure 4:
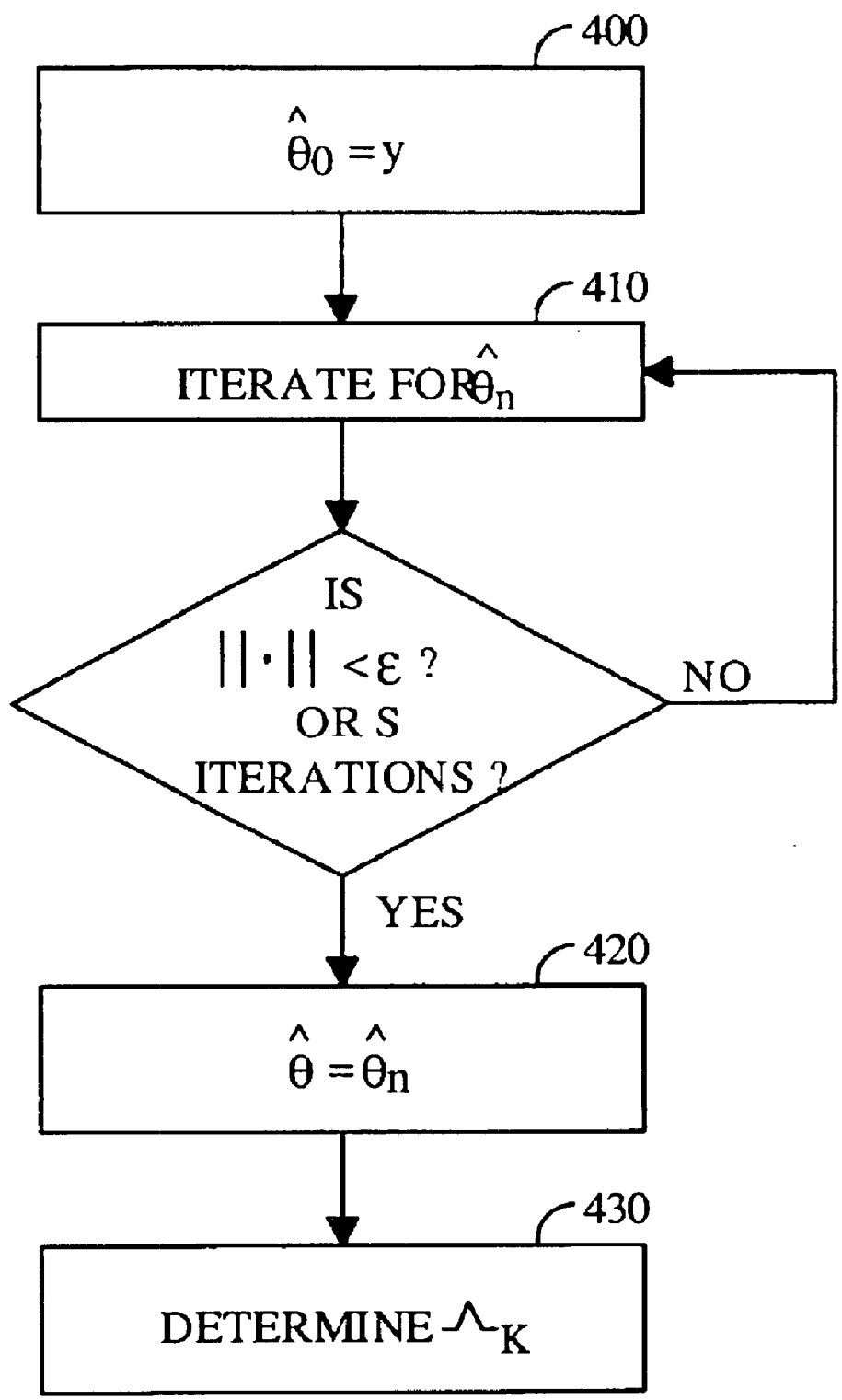
FIG. 4 is a flow chart illustrating a simplified LLR computation procedure.

In another embodiment, a simplified LLR computation procedure is implemented to calculate $\Lambda_k$. FIG. 4 is a flowchart of the procedure to calculate $\Lambda_k$. At step 400, let $\hat{\theta}_0 = y$.

At step 410, perform the iteration defined by the following equation:

$$\hat{\theta}_n = \frac{y + (1/N)(\sigma_p^2/\sigma_t^2) \sum_{j \in J} g(x_j, \hat{\theta}_{n-1})}{1 + (M/N)(\sigma_p^2/\sigma_t^2)} \qquad \text{Equation 9}$$

The above equation is iterated until $\|\hat{\theta}_n - \hat{\theta}_{n-1}\| < \epsilon$ or S iterations have occurred, whichever occurs first.

At step 420, label the last value of $\hat{\theta}_n$ as $\hat{\theta}$.

At step 430, compute the following relationship:

$$\Lambda_k = f_k(\hat{\theta}_-, -1) - f_k(\hat{\theta}_+, +1),$$

$$= \frac{2}{\sigma_t^2} \text{Re}\{\hat{\theta}^H x_k\}.$$

Both embodiments require the knowledge of $\sigma_p^2/\sigma_t^2$, which is a quantity sometimes known as the Pilot-to-Traffic ratio. This quantity is closely related to the ratio of the transmit gain of the pilot channel to the transmit gain of the traffic or data channel. Governing standard bodies mandate the value of this ratio in accordance with other transmission parameters. Also necessary for the embodiments are M, which is the number of modulation symbols, and N, which is the number of pilot symbols. The choice of M and N is flexible as long as the slowly time-varying model of Equation 5 is not violated.

Figure 5:
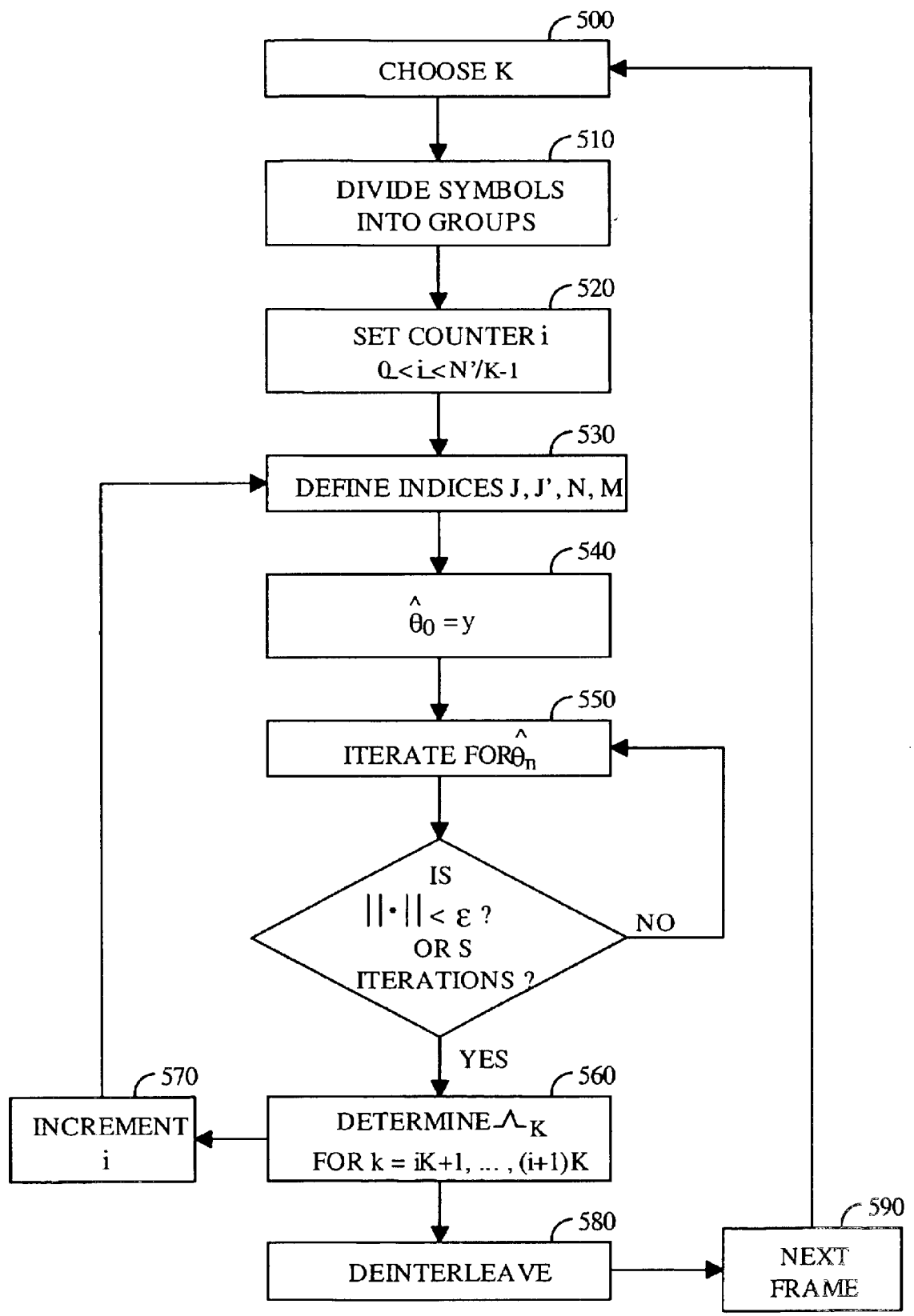
FIG. 5 is a flow chart illustrating an implementation of the simplified LLR computation procedure.

In one embodiment, the simplified LLR computation procedure is implemented in the context of a cdma2000 1X reverse link. Received modulation symbols and pilot symbols $\{x_k\}$ and $\{y_k\}$ are considered from a sequence of transmitted frames. The symbols are indexed by subscript k, wherein k=−∞, . . . , ∞. For a single frame of data, assume that the subscript k ranges from 1, . . . , N'. FIG. 5 illustrates the implementation of the simplified LLR computation procedure.

At step 500, choose a value for K. For simplified implementation, choose K that divides N' evenly.

At step 510, divide the N' symbols in a frame into groups where the $i^{th}$ group contains symbols with indices iK+1, . . . , (i+1)K. There are N'/K such groups in a frame.

At step 520, set a counter for i, ranging from 0 to N'/K−1.

At step 530, define sets of indices as follows:

$$J = \{iK+1-\underline{M}, \ldots, (i+1)K+\tilde{M}\}$$

$$J' = \{iK+1-\underline{N}, \ldots, (i+1)K+\tilde{N}\}$$

and $$N = \underline{N} + \tilde{N} + K$$

$$M = \underline{M} + \tilde{M} + K.$$

At step 540, define $$y \equiv \frac{1}{N} \sum_{j' \in J'} y_{j'},$$

and let $\hat{\theta}_0 = y$.

At step 550, iterate Equation 9 until $\|\hat{\theta}_n - \hat{\theta}_{n-1}\| < \epsilon$ or S iterations have occurred, whichever occurs first. Note that that the term $\sigma_p^2/\sigma_t^2$ is the Pilot-to-Traffic ratio, which is known. Let the last value of $\hat{\theta}_n$ be $\hat{\theta}$.

At step 560, for each k=iK+1, ..., (i+1)K, compute:

$$\Lambda_k = \frac{2}{\sigma_t^2} \text{Re}\{\hat{\theta}^H x_k\}.$$

At step 570, increment i and repeat steps 530–560, until the entire set $\{\Lambda_1, \ldots, \Lambda_{N'}\}$ is obtained.

At step 580, deinterleave $\{\Lambda_1, \ldots, \Lambda_{N'}\}$ and use a decoder to recover the information bits.

At step 590, repeat process for the next frame.

The apparatus required for the above-described embodiments comprises a receiver with a processor and memory element that are configured to perform the above calculations. The same processor or another processor can perform the function of deinterleaving. The functionality of the processor and memory element can be incorporated into the RAKE processor 230 of FIG. 2 or into another portion of the receiver, such as a decoder. The decoder can be any standard decoder or specialty decoder.

In a cdma2000 1X system, various rate configurations exist for transmitting signals over-the-air, each with mandated transmission specifications. For example, data transmitted at 19.2 kbps in Rate Configuration 3 has a nominal Pilot-to-Traffic ratio of −6.25 dB, which implies that $\sigma_p^2/\sigma_t^2 \approx 0.24$. For a 20 ms frame that is carrying N'=1536 code/modulation symbols, there are 96 such symbols per 1.25 ms Power Control Group (PCG).

In one embodiment, K is selected to equal 1, the number of iterations S equals 5, $\epsilon$ equals 0 and $\overline{M} = \underline{M} = \overline{N} = \underline{N} = 96$. For these iteration parameters, $\hat{\theta}$ is computed separately for each of the 1536 code symbols, using a 2 PCG "symmetric window" of received pilot and code symbols. The number of iterations is fixed at 5 for each of the 1536 computations of $\hat{\theta}$.

Although the number of data code symbols and pilot code symbols are similar in this embodiment, the embodiment can be implemented to use unequal numbers of code/modulation symbols and pilot symbols. For example, in one embodiment, the iteration parameters can be set as $\overline{M} = \underline{M} = 96$ and $\overline{N} = \underline{N} = 48$.

In another embodiment, K is selected to equal 96, the number of iterations S equals 5, $\epsilon$ equals 0 and $\overline{M} = \underline{M} = \overline{N} = \underline{N} 48$. For these iteration parameters, $\hat{\theta}$ is computed once per PCG-worth of code symbols. Hence, only 16 computations are required for each 20 ms frame.

In another embodiment, the iteration parameters can be the same as either of the two previously discussed embodiments, however, the function g(.,.) appearing in Equation 9 is replaced by:

$$g(x, \vec{\theta}) = \tilde{g}(\text{Re}\{\vec{\theta}^H x\})x,$$

wherein $\tilde{g}(z)$ is a monotonic, non-decreasing function of z. The function $g(\cdot,\cdot)$, defined above, uses $\tilde{g}(z) = \text{sgn}(z)$. However, a different choice of $\tilde{g}(z)$ may help improve the convergence of the iterations. As an example, for a suitable choice of c>0, $\tilde{g}(z) = \arctan(z/c)$ could be considered as an alternative.

Those of skill in the art would appreciate that the methods and apparatus described above can be applied to many different types of diversity channels. The code symbols $d_{\pi(j)}$ and pilot symbols can be conceptualized as being transmitted on an $L^{th}$-order diversity channel. The outputs of the diversity channel are two complex vectors of length L corresponding to received code symbols and pilot symbols. For example, in a cdma2000 1X reverse link, an $L^{th}$-order diversity channel can be created conceptually by assigning L fingers to L different multipath components, at different time delays and different antennas in a RAKE receiver.

In a system with frequency diversity, the same encoded frame can be transmitted on multiple carriers and fingers can be assigned to multipath components on each carrier. If there are $K_1$ and $K_2$ multipath components on each of two carriers, respectively, then the total diversity order is $L = K_1 + K_2$. For a system using time diversity, the same encoded frame can be transmitted and re-transmitted in several different time slots. Fingers can be assigned to multipath components on each re-transmission. If the transmitted frame is re-transmitted once, and there are $K_1$ and $K_2$ multipath components on each transmission, respectively, the total diversity order is again $L = K_1 + K_2$. Hence, if some pre-processing can be performed so that the general diversity model holds, the embodiments described above can be applied to multipath diversity, spatial/antenna diversity, frequency diversity, time diversity, or any combination of diversities.

Although the embodiments above have been described in the context of a cdma2000 reverse link, the embodiments can be extended to other communication systems without undue experimentation. Furthermore, the embodiments can be extended for use on either the forward or the reverse links, and in particular, can be most useful whenever the pilot signal is weak.

Those of skill in the art would understand that data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for determining likelihood values of input data bits from a plurality of code symbols and a plurality of pilot symbols, comprising:

a memory element; and a processor configured to execute a set of instructions stored in the memory element, the set of instructions for:

determining a gain vector relating the plurality of code symbols and the plurality of pilot symbols in accordance with channel characteristics; and using the gain vector to determine likelihood values of a designated code symbol, wherein the input data bits are carried by the designated code symbol, wherein using the gain vector to determine likelihood values of a designated code symbol comprises:

defining the likelihood values of the designated code symbol as a log likelihood ratio $\Lambda_k$ in accordance with the following equation:

$$\Lambda_k = \log \frac{\max_{\vec{\theta}, \{d_{\pi(j)}: j \in J-\{k\}\}} p_{\vec{\theta}}(\{x_j, y_{j'}: j \in J, j' \in J'\}|}{\max_{\vec{\theta}, \{d_{\pi(j)}: j \in J-\{k\}\}} p_{\vec{\theta}}(\{x_j, y_{j'}: j \in J, j' \in J'\}|},$$
$$d_{\pi(k)} = +1, \{d_{\pi(j)}: j \in J-\{k\}\})$$
$$d_{\pi(k)} = -1, \{d_{\pi(j)}: j \in J-\{k\}\})$$

wherein $\vec{\theta}$ is the gain vector, $p_{\vec{\theta}}(\cdot|\cdot)$ is the conditional probability; $d_{\pi(k)}$ is the designated code symbol, $x_j$ represents the plurality of code symbols, $y_{j'}$ represents the plurality of pilot symbols, and the indices J and J' are defined by:

$$J \subseteq \{j: k-\underline{M} \leq j \leq k+\overline{M}\}$$

and $$J' \subseteq \{j': k-\underline{N} \leq j' \leq k+\overline{N}\},$$

where the terms $\underline{M}$, $\overline{M}$, $\underline{N}$, and $\overline{N}$ are window boundary values.

2. The apparatus of claim 1, wherein the window boundary values $\underline{M}$, $\overline{M}$, $\underline{N}$, and $\overline{N}$ are equal.

3. The apparatus of claim 1, wherein the window boundary value $\underline{M}$ equals the window boundary value $\overline{M}$ and the window boundary value $\underline{N}$ equals the window boundary value $\overline{N}$.

4. The apparatus of claim 1, wherein the plurality of code symbols $x_j$ and the plurality of code symbols $y_{j'}$ each comprise L components.

5. The apparatus of claim 4, further comprising a RAKE "finger" assigned to each of the L components.

6. The apparatus of claim 4, wherein the L components represent L multipath signals received on a single antenna.

7. The apparatus of claim 4, wherein the L components represent L multipath signals received on two or more antennas.

8. The apparatus of claim 4, wherein the L components represent L multipath signals received from two or more transmissions.

9. The apparatus of claim 4, wherein the L components represent L multipath signals received from two or more carriers.

10. The apparatus of claim 2, wherein determining the gain vector relating the plurality of code symbols and the plurality of pilot symbols in accordance with channel characteristics comprises:

evaluating a gain vector equation defined by:

$$\hat{\theta} = \frac{y + (1/N)(\sigma_p^2/\sigma_t^2)\left[\sum_{j \in J-\{k\}} g(x_j, \hat{\theta}) + d_{\pi(k)}x_k\right]}{1 + (M/N)(\sigma_p^2/\sigma_t^2)},$$

wherein $\sigma_p^2/\sigma_t^2$ is a pilot-to-traffic ratio, $g(\cdot,\cdot)$ is a predetermined function, $d_{\pi(k)}$ is the designated code symbol, $x_j$ represents the plurality of code symbols, the index J is defined over the range $J \subseteq \{j: k-\underline{M} \leq j \leq k+\overline{M}\}$, M is the number of code symbols in the plurality of code symbols, and N is the number of pilot symbols in the plurality of code symbols.

11. The apparatus of claim 10, wherein evaluating the gain vector equation is performed iteratively with an initial condition $$\hat{\theta}_0 = y \equiv \frac{1}{N} \sum_{j' \in J'} y_{j'},$$

and with an iteration formula:

$$\hat{\theta}_n = \frac{y + (1/N)(\sigma_p^2/\sigma_t^2)\left[\sum_{j \in J-\{k\}} g(x_j, \hat{\theta}_{n-1}) + d_{\pi(k)} x_k\right]}{1 + (M/N)(\sigma_p^2/\sigma_t^2)}$$

where $Y_{j'}$ presents the plurality of pilot symbols and $J' \subseteq \{j': k-\underline{N} \leq j' \leq k+\overline{N}\}$.

12. The apparatus of claim 10, wherein using the gain vector to determine likelihood values of the designated code symbols comprises:
defining the likelihood values of the designated code symbol as a log likelihood ratio $\Lambda_k$ in accordance with the following equation:

$$\Lambda_k = f_k(\hat{\theta}_-, -1) - f_k(\hat{\theta}_+, +1)$$

wherein $$f_k(\vec{\theta}, d) \equiv \frac{1}{\sigma_t^2} \left\{ \frac{(M/N)(\sigma_p^2/\sigma_t^2)+1}{(2/N)(\sigma_p^2/\sigma_t^2)} \|\vec{\theta}\|^2 - \frac{N}{(\sigma_p^2/\sigma_t^2)} \text{Re}\{\vec{\theta}^H y\} - d\text{Re}\{\vec{\theta}^H x_k\} - \sum_{j \in J-\{k\}} \left|\text{Re}\{\vec{\theta}^H x_j\}\right| \right\},$$

and $\sigma_p^2/\sigma_t^2$ is a pilot-to-traffic ratio.

13. The apparatus of claim 2, wherein determining the gain vector relating the plurality of code symbols and the plurality of pilot symbols in accordance with channel characteristics comprises:
evaluating a gain vector equation defined by:

$$\hat{\theta} = \frac{y + (1/N)(\sigma_p^2/\sigma_t^2) \sum_{j \in J} g(x_j, \hat{\theta})}{1 + (M/N)(\sigma_p^2/\sigma_t^2)}$$

wherein $\sigma_p^2/\sigma_t^2$ is a pilot-to-traffic ratio, $g(\cdot,\cdot)$ is a predetermined function, $x_j$ represents the plurality of code symbols, the index J is defined by the relationship $J \subseteq \{j: k-\underline{M} \leq j \leq k+\overline{M}\}$, M is the number of code symbols in the plurality of code symbols, and N is the number of pilot symbols in the plurality of code symbols.

14. The apparatus of claim 13, wherein evaluating the gain vector equation is performed iteratively with an initial condition $$\hat{\theta}_0 = y \equiv \frac{1}{N} \sum_{j' \in J'} y_{j'},$$

using an iteration formula:

$$\hat{\theta}_n = \frac{y + (1/N)(\sigma_p^2/\sigma_t^2) \sum_{j \in J} g(x_j, \hat{\theta}_{n-1})}{1 + (M/N)(\sigma_p^2/\sigma_t^2)}$$

where $y_{j'}$ represents the plurality of pilot symbols and $J' \subseteq \{j': k-\underline{N} \leq j' \leq k+\overline{N}\}$.

15. The apparatus of claim 13, wherein using the gain vector to determine likelihood values of the designated code symbols comprises:
defining the likelihood values of the designated code symbol as a log likelihood ratio $\Lambda_k$ in accordance with the following equation:

$$\Lambda_k = \frac{2}{\sigma_t^2} \text{Re}\{\hat{\theta}^H x_k\},$$

wherein the superscript H represents the Hermitian transpose of the gain vector.

16. An apparatus for determining a log likelihood ratio of a designated code symbol by using a plurality of code symbols and a plurality of pilot symbols transmitted over diversity channels, comprising:
a memory element; and
a processor configured to execute a set of instructions stored in the memory element, the set of instructions for:
receiving a frame of N' code symbols;
dividing the frame of code symbols into N'/K groups of code symbols, wherein the $i^{th}$ group contains symbols with indices $iK+1, \ldots, (i+1)K$;
setting a counter for i, ranging from 0 to $(i+1)K-1N'/K-1$;
setting a plurality of indices as follows:

$J = \{iK+1-\underline{M}, \ldots, (i+1)K+\bar{M}\}$, $J' = \{iK+1-\underline{N}, \ldots, (i+1)K+\bar{N}\}$, $N = \underline{N} + \bar{N} + K$, $M = \underline{M} + \bar{M} + K$;

setting an initial gain vector condition defining $$\hat{\theta}_0 = y \equiv \frac{1}{N} \sum_{j' \in J'} y_{j'};$$

iterating a gain vector equation for a predetermined number of iterations, the gain vector equation defined by:

$$\hat{\theta}_n = \frac{y + (1/N)(\sigma_p^2/\sigma_t^2) \sum_{j \in J} g(x_j, \hat{\theta}_{n-1})}{1 + (M/N)(\sigma_p^2/\sigma_t^2)},$$

wherein $\sigma_p^2/\sigma_t^2$ is a pilot-to-traffic ratio;
setting the last value of $\hat{\theta}_n$ as $\hat{\theta}$;
computing a value $$\Lambda_k = \frac{2}{\sigma_t^2} \text{Re}\{\hat{\theta}^H x_k\}$$

for each $k = iK+1, \ldots, (i+1)K$; and
incrementing i and repeating the above steps so that a plurality of values $\{\Lambda_1, \ldots, \Lambda_{N'}\}$ is obtained.

17. A method for determining likelihood values of input data bits from a plurality of code symbols and a plurality of pilot symbols, comprising:
determining a multipath gain vector relating the plurality of code symbols and the plurality of pilot symbols in accordance with channel characteristics, wherein the multipath gain vector has entries corresponding to RAKE receiver fingers; and using the multipath gain vector to determine likelihood values of a designated code symbol, wherein the input data bits are carried by the designated code symbol.

18. A method for determining a log likelihood ratio of a designated code symbol by using a plurality of code symbols and a plurality of pilot symbols transmitted over diversity channels, comprising:

receiving a frame of N' code symbols;

dividing the frame of code symbols into N'/K groups of code symbols, wherein the $i^{th}$ group contains symbols with indices iK+1, ..., (i+1)K;

setting a counter for i, ranging from 0 to (i+1)K−1N'/K−1;

setting a plurality of indices as follows:

$$J = \{iK+1-\underline{M}, \ldots, (i+1)K+\tilde{M}\},$$

$$J' = \{iK+1-\underline{N}, \ldots, (i+1)K+\tilde{N}\},$$

$$N = \underline{N} + \tilde{N} + K,$$

$$M = \underline{M} + \tilde{M} + K;$$

setting an initial gain vector condition defining $$\hat{\theta}_0 = y \equiv \frac{1}{N} \sum_{j' \in j'} y_{j'};$$

iterating a gain vector equation for a predetermined number of iterations, the gain vector equation defined by:

$$\hat{\theta}_n = \frac{y + (1/N)(\sigma_p^2/\sigma_t^2) \sum_{j \in j} g(x_j, \hat{\theta}_{n-1})}{1 + (M/N)(\sigma_p^2/\sigma_t^2)},$$

wherein $\theta_p^2/\theta_t^2$ is a pilot-to-traffic ratio;

setting the last value of $\hat{\sigma}_n$ as $\hat{\sigma}$;

computing a value $$\Lambda_k = \frac{2}{\sigma_t^2} \mathrm{Re}\{\hat{\theta}^H x_k\}$$

for each k=iK+1, ..., (i+1)K; and incrementing i and repeating the above steps so that a plurality of values $\{\Lambda_1, \ldots, \Lambda_{N'}\}$ is obtained.

19. An apparatus for determining likelihood values of input data bits from a plurality of code symbols and a plurality of pilot symbols, comprising:

means for pre-processing the plurality of code symbols and the plurality of pilot symbols into a slowly time varying model;

means for determining a multipath gain vector relating the plurality of code symbols and the plurality of pilot symbols to the slowly time varying model, the multipath gain vector having entries for RAKE receiver fingers; and means for using the multipath gain vector to determine likelihood values of a designated code symbol, wherein the input data bits are carried by the designated code symbol.

20. An apparatus for determining likelihood values of input data bits from a plurality of code symbols and a plurality of pilot symbols, comprising:

a memory element; and a processor configured to execute a set of instructions stored in the memory element, the set of instructions for:

determining a gain vector relating the plurality of code symbols and the plurality of pilot symbols in accordance with channel characteristics; and using the gain vector to determine likelihood values of a designated code symbol, wherein the input data bits are carried by the designated code symbol.

* * * * *